United States Patent
Zhou et al.

(10) Patent No.: US 9,953,517 B2
(45) Date of Patent: Apr. 24, 2018

(54) RISK EARLY WARNING METHOD AND APPARATUS

(71) Applicant: Baidu Online Network Technology (Beijing) Co., Ltd., Beijing (CN)

(72) Inventors: Jingbo Zhou, Beijing (CN); Hongbin Pei, Beijing (CN); Haishan Wu, Beijing (CN)

(73) Assignee: Baidu Online Networks Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/246,404

(22) Filed: Aug. 24, 2016

(65) Prior Publication Data

US 2017/0278382 A1    Sep. 28, 2017

(30) Foreign Application Priority Data

Mar. 24, 2016    (CN) .......................... 2016 1 0173109

(51) Int. Cl.
| | |
|---|---|
| G08B 23/00 | (2006.01) |
| G08B 31/00 | (2006.01) |
| G08B 21/02 | (2006.01) |
| H04W 4/02 | (2018.01) |

(52) U.S. Cl.
CPC ............ *G08B 31/00* (2013.01); *G08B 21/02* (2013.01); *H04W 4/023* (2013.01)

(58) Field of Classification Search
CPC ........ G08B 31/00; G08B 21/02; H04W 4/023

USPC ...................................................... 340/573.1
See application file for complete search history.

(56) References Cited

U.S. PATENT DOCUMENTS

| | | | | |
|---|---|---|---|---|
| 6,633,232 B2 * | 10/2003 | Trajkovic | ............... | G06Q 30/06 340/573.1 |
| 7,797,100 B2 * | 9/2010 | Zaitsu | ................ | G01C 21/3492 340/995.1 |
| 2006/0106530 A1 | 5/2006 | Horvitz et al. | | |
| 2015/0219464 A1 * | 8/2015 | Beaurepaire | ....... | G01C 21/3438 701/538 |

FOREIGN PATENT DOCUMENTS

| | | |
|---|---|---|
| CN | 104408066 A | 3/2015 |
| CN | 105246033 A | 1/2016 |
| JP | 2015026136 A | 2/2015 |

* cited by examiner

*Primary Examiner* — Kerri McNally
(74) *Attorney, Agent, or Firm* — Lathrop Gage LLP (57) ABSTRACT

The present application discloses a risk early warning method and apparatus. An implementation of the method includes: monitoring, in real time, search traffic for a predetermined location from users using an online map within a preset period; determining whether the search traffic exceeds a preset search traffic threshold; and sending early warning information of a crowd gathering risk if the search traffic exceeds the preset search traffic threshold. The implementation effectively utilizes the map search traffic capable of reflecting the intention of users and realizes the early warning for the crowd gathering risk.

9 Claims, 6 Drawing Sheets

RISK EARLY WARNING METHOD AND APPARATUS

CROSS-REFERENCE TO RELATED APPLICATION

This application is related to and claims priority from Chinese Application No. 201610173109.4, filed on Mar. 24, 2016, entitled "RISK EARLY WARNING METHOD AND APPARATUS," the entire disclosure of which is hereby incorporated by reference.

TECHNICAL FIELD

The present application relates to the field of big data processing, specifically relates to the field of security, and more specifically to a risk early warning method and apparatus.

BACKGROUND

Proper management and control of crowd gathering risk is of great significance to the protection of public safety. At large-scale events or prominent public places, the rapid gathering of a large number of people is often unavoidable. No effective management and diversion during the crowd gathering events, and no preparation of a detailed and feasible contingency plan may often lead to occurrences of unplanned events and even tragedies (for example, crowd trampling events). How to effectively predict the crowd gathering risk in advance, and respond well to an emergency, is a significant problem in the management of the public safety that needs to be expeditiously solved.

SUMMARY

An objective of the present application is to provide an improved risk early warning method and apparatus, in order to solve the technical problems mentioned in the background.

In a first aspect, the present application provides a risk early warning method, including: monitoring, in real time, search traffic for a predetermined location from users using an online map within a preset period; determining whether the search traffic exceeds a preset search traffic threshold; and sending early warning information of a crowd gathering risk if the search traffic exceeds the preset search traffic threshold.

In some embodiments, the method further includes: introducing a search traffic time sequence and a positioning traffic time sequence into a pre-trained prediction model to obtain positioning traffic of mobile devices at the predetermined location after the preset period, wherein the search traffic time sequence is a time sequence of the search traffic for the predetermined location from the users using the online map, and the positioning traffic time sequence is a time sequence of positioning traffic of mobile devices at the predetermined location.

In some embodiments, the search traffic threshold is set by the following steps: recording peak values of the search traffic for the predetermined location within the preset period every day, wherein the peak values are random variables; determining a probability distribution consistent with the peak values; and setting the search traffic threshold according to a mean and a mean square error of the probability distribution.

In some embodiments, the setting of the search traffic threshold according to a mean and a mean square error of the probability distribution comprises: obtaining a weight coefficient of the mean square error of the probability distribution based on historical search traffic and historical positioning traffic; and setting a sum of a product of the weight coefficient and the mean square error and the mean of the probability distribution as the search traffic threshold.

In some embodiments, the prediction model is trained by the following steps: extracting search traffic feature information and positioning traffic feature information from a historical search traffic time sequence and a historical positioning traffic time sequence, respectively; and training the prediction model used for predicating the positioning traffic of mobile devices at the predetermined location within a future set period by using a machine learning method based on time information, the search traffic feature information and the positioning traffic feature information.

In a second aspect, the present application provides a risk early warning apparatus, including: a monitoring unit configured to monitor, in real time, search traffic for a predetermined location from users using an online map within a preset period; a determining unit configured to determine whether the search traffic exceeds a preset search traffic threshold; and an early warning unit configured to send early warning information of a crowd gathering risk if the search traffic exceeds the preset search traffic threshold.

In some embodiments, the apparatus further includes: a prediction unit configured to introduce a search traffic time sequence and a positioning traffic time sequence into a pre-trained prediction model to obtain positioning traffic of mobile devices at the predetermined location after the preset period, wherein the search traffic time sequence is a time sequence of the search traffic for the predetermined location from the users using the online map, and the positioning traffic time sequence is a time sequence of positioning traffic of mobile devices at the predetermined location.

In some embodiments, the apparatus further includes: a statistics unit configured to record peak values of the search traffic for the predetermined location within the preset period every day, wherein the peak values are random variables; a determination unit configured to determine a probability distribution consistent with the peak values; and a setting unit configured to set the search traffic threshold according to a mean and a mean square error of the probability distribution.

In some embodiments, the setting unit is further configured to: obtain a weight coefficient of the mean square error of the probability distribution based on historical search traffic and historical positioning traffic; and set a sum of a product of the weight coefficient and the mean square error and the mean of the probability distribution as the search traffic threshold.

In some embodiments, the apparatus further includes a model training unit, and the model training unit is configured to: extract search traffic feature information and positioning traffic feature information from a historical search traffic time sequence and a historical positioning traffic time sequence, respectively; and train the prediction model used for predicating the positioning traffic of mobile devices at the predetermined location within a future set period by using a machine learning method based on time information, the search traffic feature information and the positioning traffic feature information.

By means of the correlation of the search traffic for the predetermined location from users using the online map with the crowd gathering degree at the predetermined location in the future, the risk early warning method and apparatus provided in the present application monitor, in real time, search traffic for a predetermined location from users using an online map within a preset period; determine whether the search traffic exceeds a preset search traffic threshold; and send early warning information of a crowd gathering risk if the search traffic exceeds the preset search traffic threshold, so as to effectively utilize the map search traffic capable of reflecting the intention of users and achieve the early warning for the crowd gathering risk.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
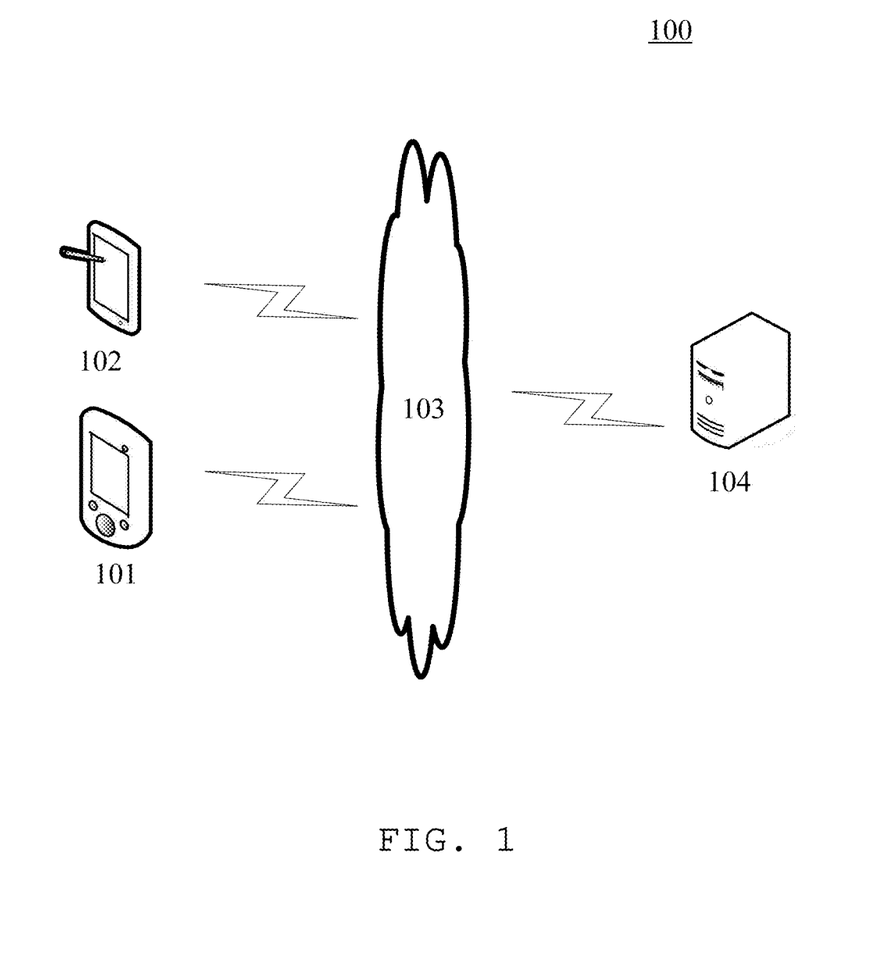
FIG. 1 is a diagram showing an exemplary system architecture in which the present application can be applied.

FIG. 1 shows an exemplary architecture of a system 100 which may be used by a risk early warning method or a risk early warning apparatus according to an embodiment of the present application.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, such as wired or wireless transmission links, or optical fibers.

The terminal devices 101 and 102 may be various electronic devices capable of being carried by a user and positioning the user, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 104 may be a server providing various services, for example, may position the terminal devices 101 and 102 in various positioning modes including, but not limited to, Global Positioning System (GPS) positioning, Wireless Fidelity (WIFI) positioning, base station positioning, Assisted Global Positioning System (AGPS) positioning, and the like. As another example, the server may carries out various kinds of analysis processing on the user positioning information.

It should be noted that the risk early warning method according to the embodiments of the present application is generally executed by the server 104, and correspondingly, the risk early warning apparatus is generally installed on the server 104.

It should be appreciated that the numbers of the terminal devices, the networks and the servers in FIG. 1 are merely illustrative. Any number of terminal devices, networks and servers may be provided based on the actual requirements.

Figure 2:
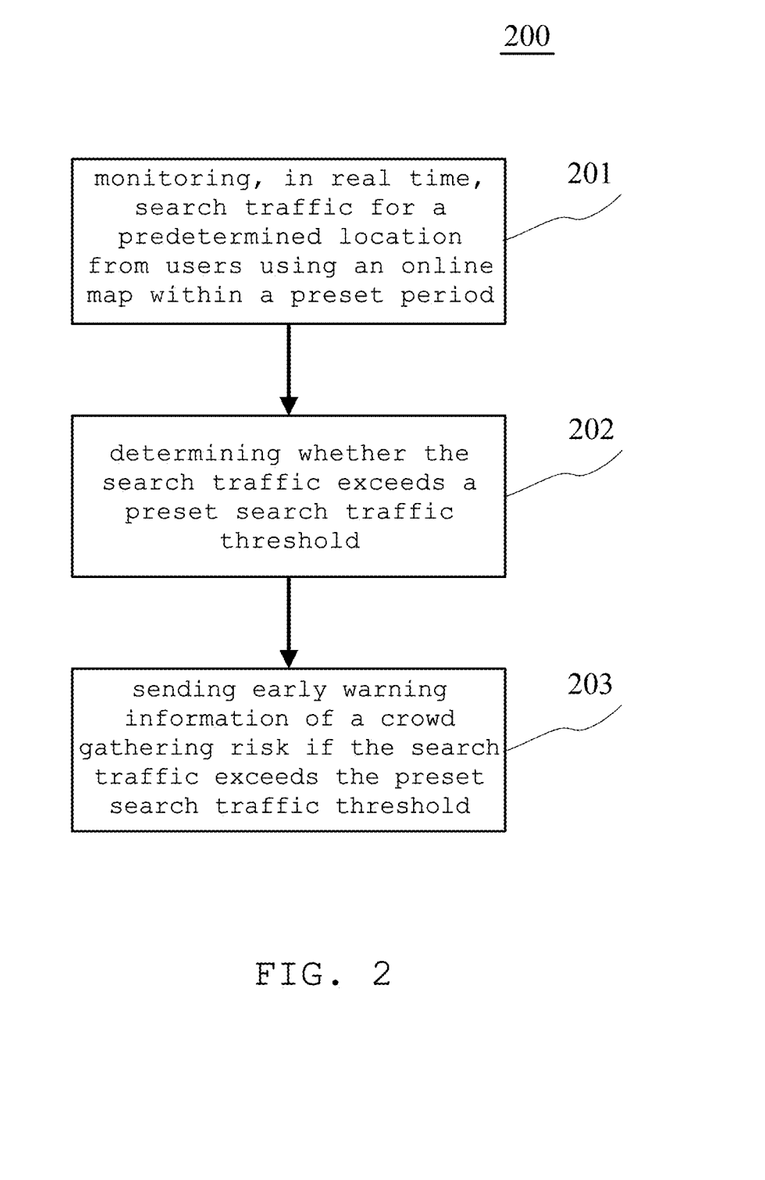
FIG. 2 is a flowchart of a risk early warning method according to an embodiment of the present application.

Continue referring to FIG. 2, showing a process 200 of a risk early warning method according to an embodiment of the present application. The risk early warning method includes the following steps.

Step 201, monitor in real time the search traffic for a predetermined location from users using an online map within a preset period.

In the embodiment, an electronic device (for example, the server 104 as shown in FIG. 1) on which the risk early warning method runs may monitor in real time the search traffic for a predetermined location from users using an online map within a preset period (for example, one hour). The predetermined location may be a place that needs to be monitored for a crowd gathering risk, for example, a scenic spot, or a place for large-scale events. The online map refers to a map stored and viewed digitally by using the computer technology, for example, Baidu map, and Google map.

With the wide-spread use of online maps, a user will often plan a route first by inputting his destination on the online map to. Thus, the search traffic for a specific location on the online map has strong correlation with the crowd density at the location in the future. In short, a large number of search behaviors for the specific location on the online map imply that a large number of users will gather at the location in the near future.

Step 202, determine whether the search traffic exceeds a preset search traffic threshold.

In the embodiment, based on the search traffic obtained at step 201, the electronic device will determine whether the search traffic exceeds a preset search traffic threshold. The search traffic threshold may be set by using various methods. For example, the search traffic threshold may be set by recording peak values of the search traffic within a preset period (for example, an hour) every day, or recording the mean of the obtained search traffic of each day. Different search traffic thresholds may be set for different periods. For example, search traffic thresholds in the daytime and at night may be respectively set according to the search traffic recorded in the daytime and at night, and the search traffic threshold of each hour may be set based on the search traffic recorded in each hour in a day.

In some alternative implementations of the embodiment, the search traffic threshold may be set by the following steps. At first, the electronic device may record peak values of the search traffic for the predetermined location within the preset period (for example, one hour) every day, wherein the peak values are random variables. Then, the electronic device may determine a probability distribution consistent with the peak values. Finally, the electronic device may set the search traffic threshold based on the mean and the mean square error of the probability distribution. Herein, the probability distribution may be determined in multiple manners. For example, a possible probability distribution may be selected according to the distribution characteristics of random variables; and then, whether the random variables conforms to the selected probability distribution is determined by a statistical method (for example, hypothesis test). After determining the probability distribution, the electronic device may further determine the mean, the variance and other parameters of the probability distribution by a sample estimation method.

Alternatively, the electronic device may obtain a weight coefficient of the mean square error of the probability distribution from the historical search traffic and historical positioning traffic at first. For example, the electronic device may select a weight coefficient a of a mean square error according to a series of historical crowd gathering abnormal events, such that the crowd gathering abnormal event will occur in a relatively large probability within a period after the historical search traffic for the occurrence location of a crowd gathering abnormal event on the online map exceeds a historical search traffic threshold $w'_m$. The historical search traffic threshold $w'_m$ satisfies $w'_m = u_{pm} + \alpha * \sigma_{pm}$, wherein $u_{pm}$ is the mean of the probability distribution, and $\sigma_{pm}$ is the mean square error of the probability distribution. Then, the sum of a product of the weight coefficient and the mean square error and the mean of the probability distribution is set as the search traffic threshold. That is, the search traffic threshold can be calculated by a formula $w_m = u_{pm} + \alpha * \sigma_{pm}$, wherein $w_m$ is the search traffic threshold, $u_{pm}$ is the mean of the probability distribution, $\sigma_{pm}$ is the mean square error of the probability distribution, and $\alpha$ is the weight coefficient of the mean square error of the probability distribution. At this stage, many methods are available for determining whether a crowd gathering abnormal event occurs at a location. For example, the method may be manual determination. As another example, it is determined as below. Assuming that the peak value of the number of positioning devices at a location within a set period (for example, an hour) every day is pq(d) and the mean and variance of the probability distribution ρ(d) to which pq(d) conforms are respectively $u_{pq}$ and $\sigma_{pq}^2$, wherein the positioning devices may be portable mobile devices, it is set that the crowd gathering abnormal event occurs once the number of the positioning devices at the location within the set period is larger than $u_{pq} + 3\sigma_{pq}$. Step 203, send early warning information of a crowd gathering risk if the search traffic exceeds the preset search traffic threshold.

In the embodiment, based on the determination result at step 202, if the search traffic exceeds the preset search traffic threshold, the electronic device may send early warning information of the crowd gathering risk to related departments or personnel (for example, a safety management department of the government, a scenic spot management department, and a large-scale event organizer).

Figure 3:
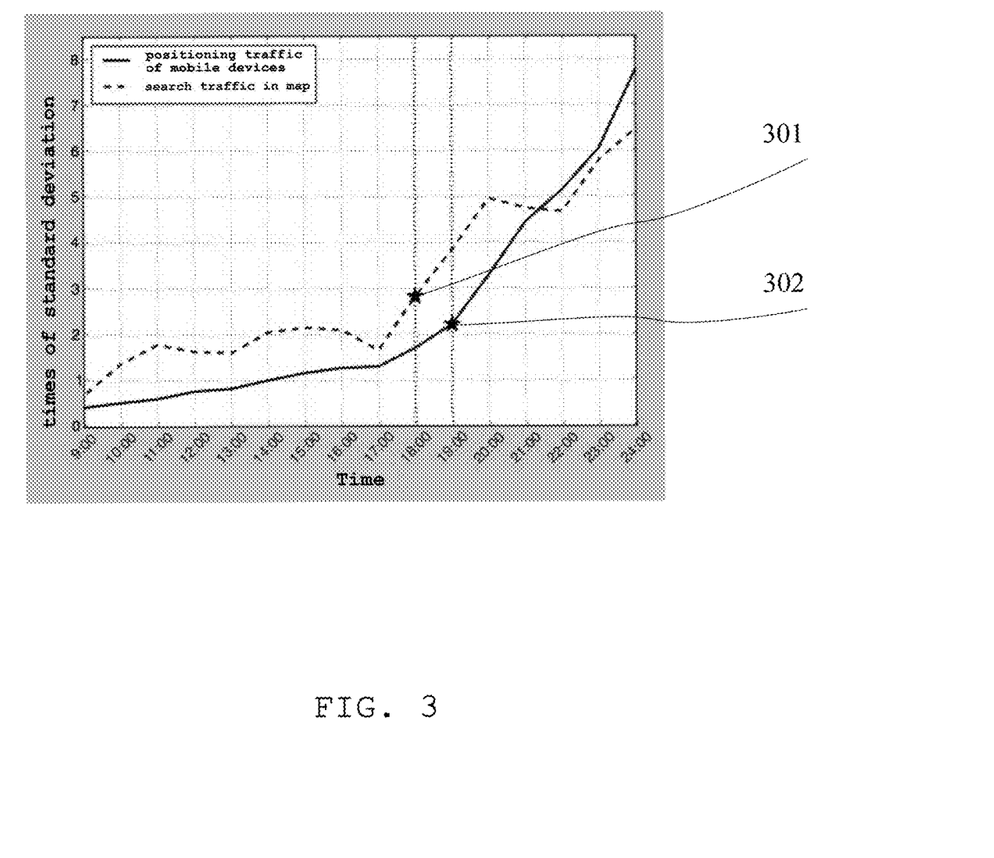
FIG. 3 is a schematic diagram of an application scenario of a risk early warning method according to the present application.

FIG. 3 is a schematic diagram of an application scenario of the risk early warning method according to the embodiment. The application scenario of FIG. 3 is an early warning schematic diagram of a certain trampling event, in which the solid line expresses the map search traffic for the location from users using an online map, the dotted line expresses the positioning traffic of mobile devices (namely, the estimated number of people) at the location, the horizontal ordinate is time, and the vertical ordinate is the times obtained by dividing the map search traffic and the positioning traffic of mobile devices by respective standard deviations. The search traffic for the location from users using an online map is monitored in real time within each hour; whether the search traffic exceeds a preset search traffic threshold is determined; and early warning information of a crowd gathering risk is sent, if the search traffic exceeds the preset search traffic threshold. In the application scenario, the search traffic for the location from the users using the online map exceeds the search traffic threshold at about 18:00, as shown at the point 301, and the positioning traffic of mobile devices exceeds a crowd-gathering-risk warning threshold at about 19:00, as shown at the point 302.

The method provided in this embodiment of the present application effectively utilize the map search traffic reflecting the intention of users to predict the crowd gathering risk, so that a warning for the crowd gathering risk can be sent ahead of a sufficient time to gain time for the management and control of the risk.

Figure 4:
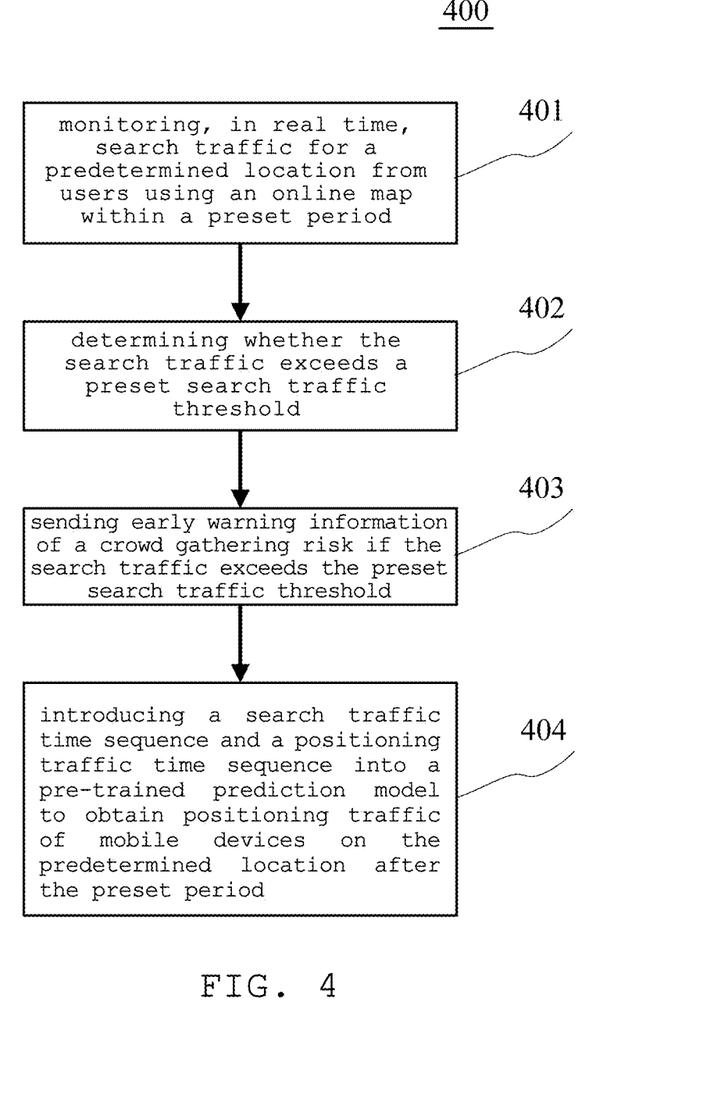
FIG. 4 is a flowchart of a risk early warning method according to another embodiment of the present application.

Referring to FIG. 4, it shows a process 400 of the risk early warning method according to another embodiment. The process 400 of the risk early warning method includes the following steps.

Step 401, monitor, in real time, search traffic for a predetermined location from users using an online map within a preset period.

In the embodiment, step 401 is similar to step 201 of the embodiment corresponding to FIG. 2, and will not be described in detail herein.

Step 402, determine whether the search traffic exceeds a preset search traffic threshold.

In the embodiment, step 402 is similar to step 202 of the embodiment corresponding to FIG. 2, and will not be described in detail herein.

Step 403, send early warning information of a crowd gathering risk, if the search traffic exceeds the preset search traffic threshold.

In the embodiment, step 403 is similar to step 203 of the embodiment corresponding to FIG. 2, and will not be described in detail herein.

Step 404, introduce a search traffic time sequence and a positioning traffic time sequence into a pre-trained prediction model to obtain positioning traffic of mobile devices at the predetermined location after the preset period.

In the embodiment, the electronic device may introduce a search traffic time sequence and a positioning traffic time sequence into a pre-trained prediction model to obtain positioning traffic of mobile devices at the predetermined location after the preset period, wherein the search traffic time sequence is a time sequence of the search traffic for the predetermined location from the users using the online map, and the positioning traffic time sequence is a time sequence of positioning traffic of mobile devices at the predetermined location. Herein, the search traffic time sequence may also be considered as a sequence formed by sequencing the numerical values of the search traffic in their chronological order, and the positioning traffic time sequence may also be considered as a sequence formed by sequencing the numerical values of positioning traffic of mobile devices carried by users in their chronological order. The preset period may be manually set and depends on the expected time in advance for the prediction.

In some alternative implementations of the embodiment, the prediction model may be trained by the following steps. At first, the search traffic feature information and positioning traffic feature information are extracted from a historical search traffic time sequence and a historical positioning traffic time sequence, respectively. The search traffic feature information may be various information related to the historical search traffic, for example, the map search traffic for the predetermined location within the current one hour, the map search traffic for the predetermined location within the current two hours, and the map search traffic for the predetermined location between 20:00 and 24:00 at last night. The positioning traffic feature information may be various information related to the historical positioning traffic, for example, the number of positioning devices at the predetermined location within the current one hour, and the number of positioning devices at the predetermined location within the current two hours. Then, the prediction model used for predicating the positioning traffic of mobile devices at the predetermined location within a future set period is trained by using a machine learning method based on time information, the search traffic feature information and the positioning traffic feature information. For example, the time information, the search traffic feature information and the positioning traffic feature information can be input to a selected original model (for example, a gradient enhanced decision tree model) such that the prediction model can be trained. The time information may be various information related to time, for example, information reflecting whether it is a holiday, or whether it is Monday. The machine learning method includes, but not limited to, linear regression, support vector regression, Gauss process and gradient enhanced decision tree. After the prediction model is trained, the accuracy of the prediction model may be reflected with the precision rate, recall rate, F1-score (F1 score) and other indices.

It can be seen from FIG. 4 that, compared with the embodiment corresponding to FIG. 2, the process 400 of the risk early warning method in the embodiment emphasizes the prediction of the positioning traffic of mobile devices at the predetermined location after a set period, so as to achieve quantitative assessment for the crowd gathering risk.

Figure 5:
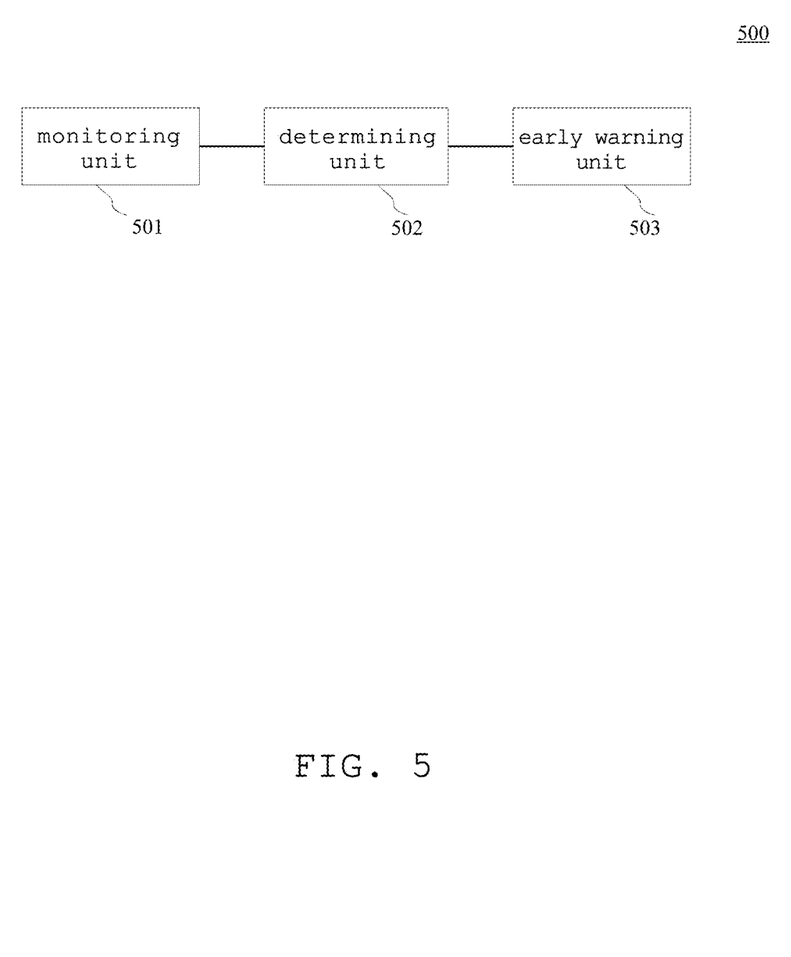
FIG. 5 is a schematic diagram of a structure of a risk early warning apparatus according to an embodiment of the present application.

Further referring to FIG. 5, as an implementation for the methods as shown in the above figures, the present application provides a risk early warning apparatus according to an embodiment, the apparatus of the embodiment corresponds to the method of the embodiment as shown in FIG. 2, and the apparatus can be specifically applied to various electronic devices.

As shown in FIG. 5, the risk early warning apparatus 500 of the embodiment includes: a monitoring unit 501, a determining unit 502 and an early warning unit 503. The monitoring unit 501 is used to monitor, in real time, search traffic for a predetermined location from users using an online map within a preset period. The determining unit 502 is used to determine whether the search traffic exceeds a preset search traffic threshold. The early warning unit 503 is used to send early warning information of a crowd gathering risk, if the search traffic exceeds the preset search traffic threshold.

In the embodiment, the detailed operations of the monitoring unit 501, the determining unit 502 and the early warning unit 503 may be similar to the detailed description of step 201, the step 202 and the step 203 in the embodiment corresponding to FIG. 2, and will not be repeated herein.

In some alternative implementations of the embodiment, the apparatus further includes: a prediction unit (not shown) configured to introduce a search traffic time sequence and a positioning traffic time sequence into a pre-trained prediction model to obtain positioning traffic of mobile devices at the predetermined location after the preset period, wherein the search traffic time sequence is a time sequence of the search traffic for the predetermined location from the users using the online map, and the positioning traffic time sequence is a time sequence of positioning traffic of mobile devices at the predetermined location. The implementation may be similar to the detailed description of step 404 in the embodiment corresponding to FIG. 4, and will not be described in detail herein.

In some alternative implementations of the embodiment, the apparatus further includes: a statistics unit (not shown) configured to record peak values of the search traffic for the predetermined location within the preset period every day, wherein the peak values are random variables; a determination unit (not shown) configured to determine a probability distribution consistent with the peak values; and a setting unit (not shown) configured to set the search traffic threshold according to a mean and a mean square error of the probability distribution. The implementation may be similar to the detailed description of a corresponding implementation in the embodiment corresponding to FIG. 2, and will not be described in detail herein.

In some alternative implementations of the embodiment, the setting unit is further configured to: obtain a weight coefficient of the mean square error of the probability distribution based on historical search traffic and historical positioning traffic; and set a sum of a product of the weight coefficient and the mean square error and the mean of the probability distribution as the search traffic threshold. The implementation may be similar to the detailed description of a corresponding implementation in the embodiment corresponding to FIG. 2, and will not be described in detail herein.

In some alternative implementations of the embodiment, the apparatus further includes a model training unit (not shown), and the model training unit is configured to: extract search traffic feature information and positioning traffic feature information from a historical search traffic time sequence and a historical positioning traffic time sequence, respectively; and train the prediction model used for predicating the positioning traffic of mobile devices at the predetermined location within a future set period by using a machine learning method based on time information, the search traffic feature information and the positioning traffic feature information. The implementation may be similar to the detailed description of a corresponding implementation in the embodiment corresponding to FIG. 4, and will not be described in detail herein.

Figure 6:
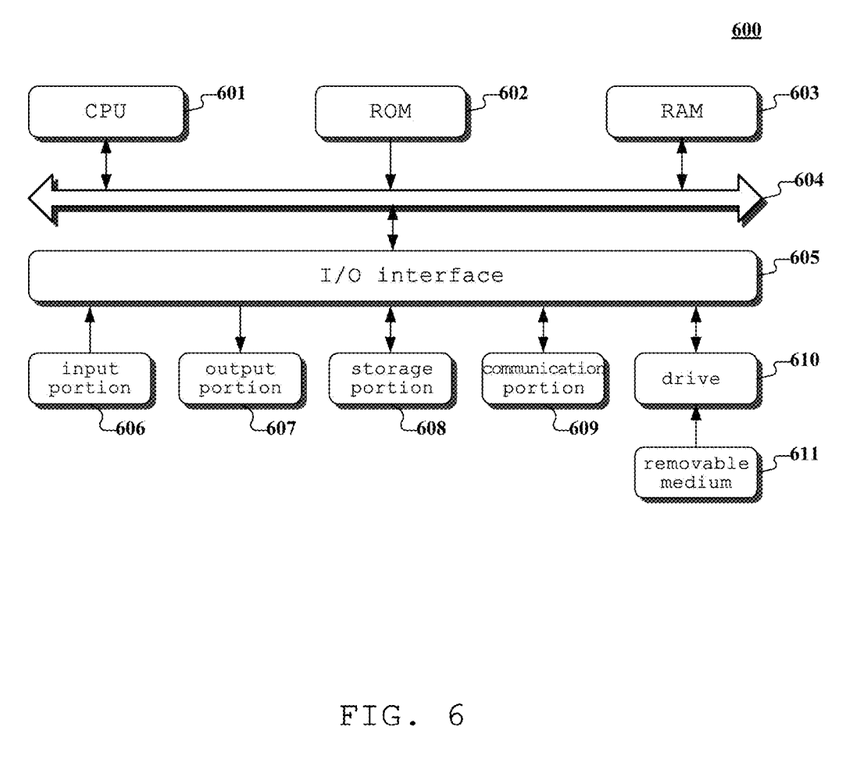
FIG. 6 is a schematic structural view of a computer system adapted to implement a terminal apparatus or a server of the embodiments of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611. When the computer program is executed by the central processing unit (CPU) 601, the above-mentioned function limited in the method of the present application is achieved.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units may also be provided in a processor, for example, described as: a processor, including a monitoring unit, a determining unit, and an early warning unit. The names of these units or modules are not considered as a limitation to the units. For example, the monitoring unit may also be described as "a unit for monitoring, in real time, search traffic for a predetermined location from users using an online map within a preset period".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: monitor, in real time, search traffic for a predetermined location from users using an online map within a preset period; determine whether the search traffic exceeds a preset search traffic threshold; and send early warning information of a crowd gathering risk if the search traffic exceeds the preset search traffic threshold.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A risk early warning method, comprising:
    monitoring, in real time, search traffic for a predetermined location from users using an online map within a preset period;
    determining whether the search traffic exceeds a search traffic threshold, the search traffic threshold being set by
        recording peak values of the search traffic for the predetermined location within the preset period every day, wherein the peak values are random variables;
        determining a probability distribution consistent with the peak values; and
        setting the search traffic threshold according to a mean and a mean square error of the probability distribution; and
    sending early warning information of a crowd gathering risk if the search traffic exceeds the search traffic threshold.

2. The method according to claim 1, further comprising:
    introducing a search traffic time sequence and a positioning traffic time sequence into a pre-trained prediction model to obtain positioning traffic of mobile devices at the predetermined location after the preset period, wherein the search traffic time sequence is a time sequence of the search traffic for the predetermined location from the users using the online map, and the positioning traffic time sequence is a time sequence of positioning traffic of mobile devices at the predetermined location.

3. The method according to claim 1, wherein the setting of the search traffic threshold according to a mean and a mean square error of the probability distribution comprises:
    obtaining a weight coefficient of the mean square error of the probability distribution based on historical search traffic and historical positioning traffic; and
    setting a sum of a product of the weight coefficient and the mean square error and the mean of the probability distribution as the search traffic threshold.

4. The method according to claim 2, wherein the prediction model is trained by the following steps:
    extracting search traffic feature information and positioning traffic feature information from a historical search traffic time sequence and a historical positioning traffic time sequence, respectively; and
    training the prediction model used for predicating the positioning traffic of mobile devices at the predetermined location within a future set period by using a machine learning method based on time information, the search traffic feature information and the positioning traffic feature information.

5. A risk early warning apparatus, comprising:
    at least one processor; and a memory storing instructions, which when executed by the at least one processor, cause the at least one processor to perform operations, the operations comprising:

monitoring, in real time, search traffic for a predetermined location from users using an online map within a preset period;

recording peak values of the search traffic for the predetermined location within the preset period every day, wherein the peak values are random variables;

determining a probability distribution consistent with the peak values; and setting a search traffic threshold according to a mean and a mean square error of the probability distribution determining whether the search traffic exceeds the search traffic threshold; and sending early warning information of a crowd gathering risk if the search traffic exceeds the search traffic threshold.

6. The apparatus according to claim 5, wherein the operations further comprises:

introducing a search traffic time sequence and a positioning traffic time sequence into a pre-trained prediction model to obtain positioning traffic of mobile devices at the predetermined location after the preset period, wherein the search traffic time sequence is a time sequence of the search traffic for the predetermined location from the users using the online map, and the positioning traffic time sequence is a time sequence of positioning traffic of mobile devices at the predetermined location.

7. The apparatus according to claim 5, wherein the setting the search traffic threshold according to a mean and a mean square error of the probability distribution comprises:

obtaining a weight coefficient of the mean square error of the probability distribution based on historical search traffic and historical positioning traffic; and setting a sum of a product of the weight coefficient and the mean square error and the mean of the probability distribution as the search traffic threshold.

8. The apparatus according to claim 6, the prediction model is trained by the following steps:

extracting search traffic feature information and positioning traffic feature information from a historical search traffic time sequence and a historical positioning traffic time sequence, respectively; and training the prediction model used for predicating the positioning traffic of mobile devices at the predetermined location within a future set period by using a machine learning method based on time information, the search traffic feature information and the positioning traffic feature information.

9. A non-transitory storage medium storing one or more programs, the one or more programs when executed by an apparatus, causing the apparatus to perform a risk early warning method, comprising:

monitoring, in real time, search traffic for a predetermined location from users using an online map within a preset period;

determining whether the search traffic exceeds a search traffic threshold, the search traffic threshold being set by recording peak values of the search traffic for the predetermined location within the preset period every day, wherein the peak values are random variables;

determining a probability distribution consistent with the peak values; and setting the search traffic threshold according to a mean and a mean square error of the probability distribution; and sending early warning information of a crowd gathering risk if the search traffic exceeds the search traffic threshold.

* * * * *